DAVID GERALD LOGAN - INVENTOR
by
Campbell Brumbaugh Free and Graves
his Attorneys.

April 11, 1961 D. G. LOGAN 2,979,568

REMOTE IMPEDANCE SYSTEM APPARATUS FOR CONTROLLING DICTATING MACHINES

Filed Oct. 27, 1954 2 Sheets-Sheet 2

DAVID GERALD LOGAN INVENTOR

BY Campbell, Brumbaugh, Free & Graves his Attorneys

United States Patent Office
2,979,568
Patented Apr. 11, 1961

2,979,568

REMOTE IMPEDANCE SYSTEM APPARATUS FOR CONTROLLING DICTATING MACHINES

David Gerald Logan, Southchurch, Southend-on-Sea, England, assignor to Unilever Limited, Port Sunlight, England, a company of Great Britain Filed Oct. 27, 1954, Ser. No. 465,061

Claims priority, application Great Britain Nov. 10, 1953

5 Claims. (Cl. 179—6)

Figure 1:
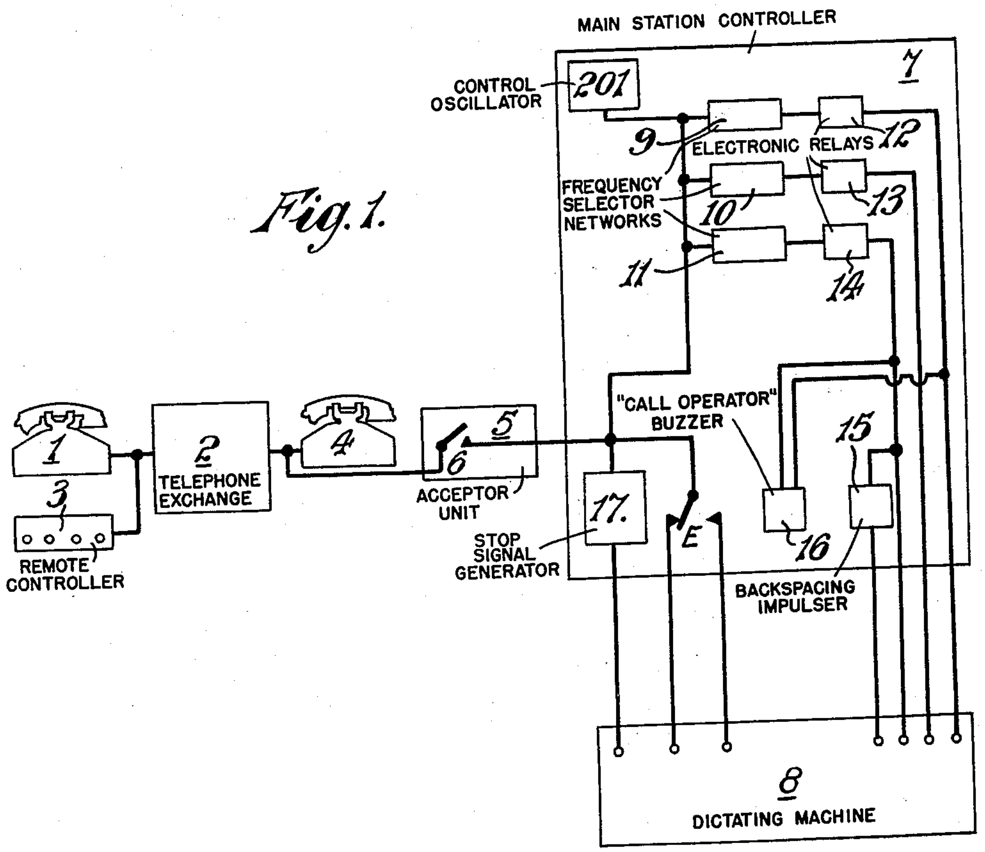

This invention relates to a method and apparatus for controlling dictating machines over a telephone system.

It has heretofore been proposed to couple a dictating machine to a telephone set (hereinafter referred to as the main station telephone set) so that when the main station telephone set is connected to a second telephone set (hereinafter referred to as the dictator's telephone set) a message can be dictated into the dictator's telephone set and recorded by the dictating machine. However, in order that the dictator at the dictator's telephone set can set the dictating machine to the required conditions, which are usually "start," "stop," "record," "listen" (or "play-back") and "back-space," complex control apparatus or additional wiring systems are required.

We have described and claimed in our U.S. application Serial No. 369,838 a method and apparatus which enables a dictator at the dictator's telephone set, after his call has been accepted, to set the dictating machine to which it is connected by the telephone system to all the conditions required for normal operation to enable him to record a message, to back-space and listen to the message he has just recorded, to correct a passage, and to stop the machine.

In the preferred embodiment described in that application the apparatus comprises a remote controller for producing a plurality of switching signals each of which is of a different and substantially constant audio frequency, said remote controller being connected to the telephone system at the dictator's telephone set for injection of the switching signals, a dictating machine connected to the telephone system for speech transmission, and a main station controller responsive to the switching signals transmitted by the telephone system for setting the dictating machine to the required condition, said main station controller being connected to the telephone system for the reception of the transmitted switching signals and to the dictating machine for setting it to the required condition.

It will be noted that, in the preferred embodiment described in our co-pending application the remote controller, which is situated near the dictator's telephone set, is an active network in the form of an electronic oscillator, and therefore requires a power supply. Thus, though one main station controller can be used by a plurality of dictators, each dictator's telephone set requires an active network with its own power supply.

It is an object of the present inventon to provide a method and apparatus for the remote control of dictating machines over a telephone system in which the necessity of providing each dictator's telephone set with an active network and associated power supply has been obviated.

According to the present invention the remote controller comprises a passive network and an active network is situated elsewhere in the system, preferably close to or incorporated in the main station controller.

The present invention, therefore, provides a method for the remote control of a dictating machine over a telephone system, which method comprises injecting into the telephone system an alternating current signal or a plurality of alternating current signals capable of transmission by said system, changing the impedance presented by the system or part of said system to said signal or signals to change its or their level or a level of a part thereof, detecting said level or change of level and utilising said level or change of level to switch the dictating machine to a required condition in response to said change or changes of impedance.

The present invention also provides an apparatus for controlling a dictating machine over a telephone system which apparatus comprises a control oscillator for injecting into the telephone system an alternating current signal or a plurality of alternating current signals capable of transmission by the system, a remote controller for coupling to said system and capable of changing the impedance presented by said system or a part thereof to said signal or signals, and a main station controller responsive to the level or change of level of the said signal or signals or a part thereof for setting the dictating machine to a required condition.

The remote controller is preferably connected in parallel with the dictator's telephone set. The remote controller should then be arranged to have normally a high impedance, but on operation of switches should have a low impedance at certain predetermined and distinct frequencies, i.e., at the frequencies of the signals. The control oscillator consists preferably of a plurality of oscillator circuits, one for each signal. The oscillator output circuits should have a low internal impedance. The control oscillator output effectively feeds the main station controller in series with the telephone system. Thus, by adjusting the impedance of the remote controller, the proportion of the oscillator output injected into the main station controller can be varied. The arrangement is such that when the remote controller has a high impedance the proportion of the oscillator output injected into the main station controller is below the minimum level to which the main station controller can respond. Should the dictator desire to change the condition of the dictating machine, he adjusts the remote controller so that it has a low impedance at the frequency of the signal corresponding to the required condition. At this frequency the impedance in series with the main station controller is considerably lower so that the proportion of the oscillator output injected into the main station controller will rise above the minimum level to which the main station controller can respond and will, therefore, set the dictating machine to the required condition.

Thus, the operation of the passive network situated at the dictator's telephone set causes the control oscillator to inject into the main station controller a signal of the required frequency having an amplitude above the minimum level. Signals injected into the main station controller having an amplitude above the minimum level, i.e., signals to which the main station controller can respond, are referred to as switching signals.

If desired, interference, if any, may be prevented by means of filter networks. These filter networks may, for example, comprise two low pass filters, one being connected in series with the dictator's telephone set, and the other being connected in series with the speech terminals of the dictating machine. If desired, speech transmission may be prevented from reaching the control oscillator by insertion of a high pass filter.

Should the control oscillator be incorporated in the main station controller, references to the oscillator output being injected into the main station controller are intended to indicate that the oscillator output is injected into the frequency responsive components of the main station controller, i.e., the selective networks, as will be described hereafter.

The control oscillator, instead of being arranged to generate a plurality of signals each being of a different and substantially constant frequency, may be arranged to generate a frequency modulated signal. In that case, the upper and lower frequency range should extend slightly beyond the corresponding highest and lowest frequency of the individual signals. The rate of modulation should be adjusted in accordance with the response of the main station controller. The control oscillator may also be arranged to "sweep" through the required frequency range.

The remote controller may also be connected in series with the dictator's telephone set. The remote controller should then have normally a low impedance but be arranged, on operation of switches, to have a high impedance at certain predetermined and distinct frequencies, i.e., at the frequencies of the switching signals. The control oscillator should then have a high output impedance, and the main station controller should be connected across its output terminals so that when the remote controller has a low impedance the telephone system loads the control oscillator to such an extent that its output falls below the minimum level to which the main station controller can respond. Should the dictator desire to change the condition of the dictating machine, he adjusts the remote controller so that it has a high impedance at the frequency of the signal corresponding to the required condition. The control oscillator is then no longer loaded at this frequency with the low impedance of the telephone system, and its output consequently rises above the minimum level to which the main station controller can respond.

Figure 2:
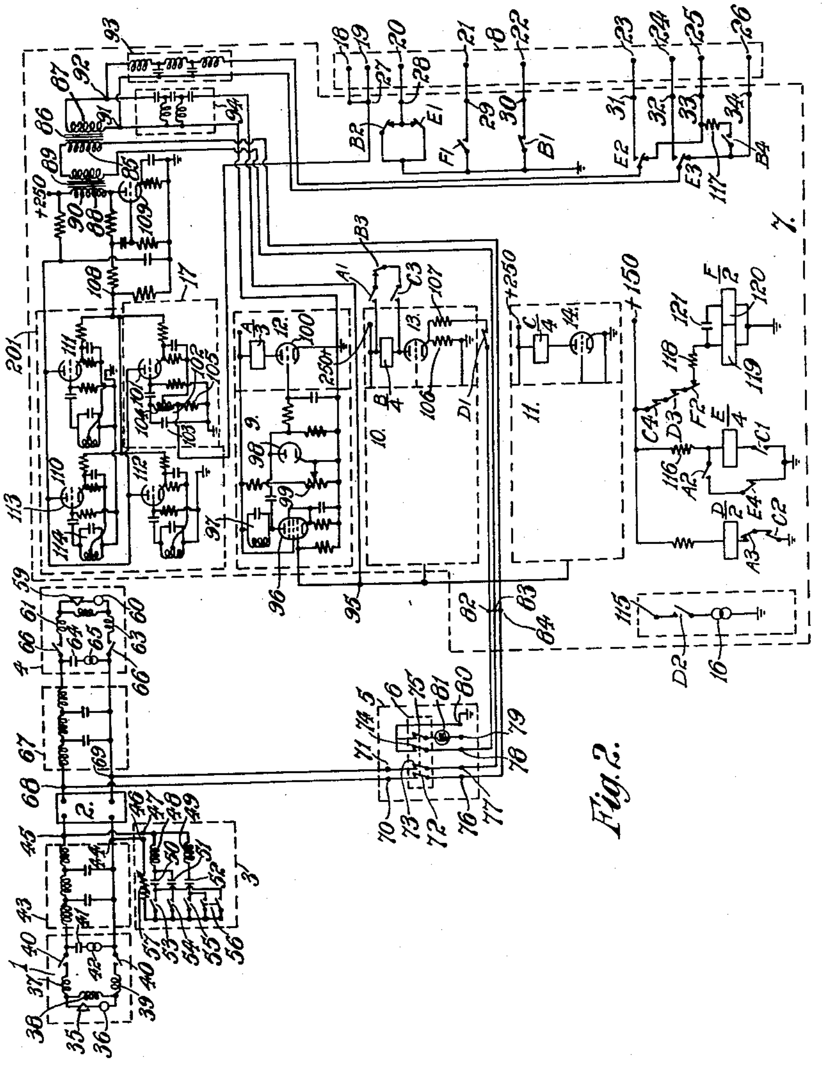

A preferred embodiment of the invention will now be described with reference to the accompanying drawings in which Fig. 1 shows a conventional block diagram and Fig. 2 shows a circuit diagram.

Referring to Fig. 1, the dictator's telephone set 1 is connected by means of a telephone line to a telephone exchange 2. The remote controller 3 is connected in parallel with the telephone line at the dictator's telephone set. The remote controller 3 is a passive network having normally a high impedance which is arranged, on operation of three switch buttons, to present a low shunt impedance to the telephone line at three predetermined frequencies, namely 7, 8 and 9 kc./s., respectively. These frequencies are the frequencies corresponding to "record," "stop," and "listen" and "backspace." The "listen" and "backspace" conditions are controlled by one frequency as will be shown hereafter. The call operator buzzer is actuated when switching signals of both the "record" and the "listen" frequency are injected simultaneously into the main station controller. This is achieved by pressing a fourth button which is the electrical equivalent of pressing simultaneously the first and the third button.

The telephone exchange 2 is connected by means of a telephone line to the main station telephone set 4. The telephone line at the main station telephone set 4 is also connected via an acceptor unit 5, provided with a switch 6, to the main station controller 7 and from there to the dictating machine 8. The main station controller 7 includes the control oscillator 201. The control oscillator comprises three oscillator circuits arranged to oscillate at 7 kc./s., 8 kc./s. and 9 kc./s., respectively. The main station controller 7 also comprises three selective networks 9, 10 and 11 connected in parallel. The control oscillator 201 feeds the common input of the three selectors in series with the telephone system. Each selective network comprises a frequency selective amplifier responsive to one of the predetermined frequencies, namely 7 kc./s., 8 kc./s. and 9 kc./s., and a detector rectifier. Each selective network is followed by an electronic relay 12, 13 and 14, respectively. The three electronic relays cause operation of the conventional controls of the dictating machine, namely, "record," "stop," and "listen" and "backspace" respectively. The last two conditions are controlled by one selective network. The backspacing controller is actuated through a backspacing impulsor 15. The "call operator" buzzer 16 is controlled by simultaneous operation of selective networks 9 and 11.

The input and output terminals of the dictating machine corresponding to "record" and "listen" are connected by the change-over contacts of a relay E through switch 6 to the telephone line for the transmission of speech.

The main station controller also comprises an oscillator 17 (hereinafter referred to as the stop signal generator) which is capable of producing audible notes to indicate "stop" and "end of recording medium." The stop signal generator is also connected through switch 6 to the telephone line.

The mode of operation will now be described in simplified form with reference to Fig. 1. The dictator calls the main station telephone by dialling its number. When the main station telephone rings, an operator lifts the receiver and, on being informed that the dictating machine is required, closes switch 6. The dictator can now switch the dictating machine to the required condition without further assistance from the operator.

The dictator now presses the "record" switch button of the remote controller 3. The remote controller thereupon presents a low impedance to the telephone line to signals having a frequency of 7 kc./s., i.e. the frequency at which the selective network 9 responds. As a result the proportion of the 7 kc./s. output of the control oscillator 201 fed to the common input of the three selective networks rises above the minimum level, and a switching signal having this frequency is consequently injected into the three selective networks. This 7 kc./s. signal is amplified and rectified by selective network 9, the output of which then actuates the electronic relay 12, which, in turn, starts the dictating machine and switches it to the "record" condition. The electronic relay 12 also causes the changeover contacts of relay E to connect the telephone line to the speech input terminals of the dictating machine. The dictator then dictates his message, which is transmitted over the telephone lines via the exchange 2 to the acceptor unit 5 and switch 6, and, from there, over the contacts of relay E to the speech input terminals of the dictating machine.

On completion of the message, the dictator presses the "stop" switch button. The remote controller thereupon presents a low impedance to the telephone line to signals having a frequency of 8 kc./s., i.e. the frequency at which the selective network 10 responds, and, in the above described manner, electronic relay 13 is actuated and switches the dictating machine to the "stop" condition and causes the changeover contacts of relay E to connect the telephone line to the speech output terminals of the dictating machine.

Should the dictator desire to have part of the previously recorded message repeated, he presses the "listen" switch button. The remote controller thereupon presents a low impedance to the telephone line to signals having a frequency of 9 kc./s., i.e. the frequency at which the selective network 11 responds and, in the above described manner, electronic relay 14 is actuated. The relay starts the machine and switches it to the "listen" condition. In addition, as long as the "listen" switch button is pressed, the backspacing impulsor 15 which, as mentioned earlier, is also controlled by the electronic relay 14, sends a series of impulses to the backspacing mechanism in the dictating machine. The arrangement is such that the record play-back head of the machine is moved back through a distance corresponding to approximately four seconds of recording for each impulse received. The dictator continues to press the "listen" button until the record play-back head has been backspaced to the required passage of the recording. When the beginning of the required passage has been reached, the dictator releases the "listen" switch button and the dictating machine then plays back the message. The purpose of the backspacing impulsor 15 is to enable the setting of the dictating machine to the "listen" condition as well as the backspacing to be controlled by one channel, i.e. one oscillator, one selective network, and one electronic relay.

Should the dictator desire to erase a part of the message he backspaces to the required passage by operation of the "listen" switch button, and then presses the "record" switch button, thereby causing selective network 9 to actuate the electronic relay 12 which switches the the dictating machine to the "record" condition. The record play-back head of the dictating machine is then in the "record" condition. The record play-back head is preceded by an erasing head which is energised when the dictating machine is set to the "record" condition. The dictating machine, therefore, now proceeds to erase the passage to be corrected. Simultaneously with the erasure the dictator can dictate the correct version.

Though setting the dictating machine to the required condition has been described as starting with the machine in the "stop" condition, there is no need to stop the machine prior to switching from one condition to another.

When the dictator has finished his recording, he presses the "call operator" switch button. The remote controller thereupon presents simultaneously a low impedance to the telephone line to signals having a frequency of 7 kc./s. and 9 kc./s. i.e. frequencies at which both selective networks 9 and 11 respond. In the above described manner, electronic relays 12 and 14 are thereupon actuated simultaneously and energise the buzzer 16. The operator thereupon lifts the hand set of his main station telephone set 4 and opens switch 6. The dictator can now give the operator any instructions he desires.

The purpose of utilising selective networks 9 and 11 in combination is to eliminate a complete channel comprising an oscillator, selective network and electronic relay. The elimination of the channels that would be required for control of the call operator buzzer and for backspacing also reduces the band width required.

A more detailed description of the apparatus shown diagrammatically in Fig. 1 will now be given with reference to Fig. 2 in which all relays are shown in the unenergised, i.e. in the released condition.

Although the present invention is applicable to various types of dictating machines, the preferred embodiment will be described with reference to a dictating machine which is provided with three electro magnetic relays or actuators for setting it to the required condition. These relays or actuators consist of a "stop" actuator, a "listen-record" relay, and a "backspace" actuator. One end of the winding of each relay or actuator is connected to a one-terminal of a two-terminal source of D.C., the other terminal of that source being earthed. The other end of each winding is connected to a terminal 20, 21 and 22 respectively. Terminal 18 of the dictating machine is connected through a cam operated switch, not shown, to earth. The cam operated switch is closed intermittently when the recording head is within thirty seconds of recording of the end of the recording medium. Terminal 19 of the dictating machine is earthed through a contact in the dictating machine, not shown, which is closed by the clutch of the dictating machine when the clutch is disengaged. Terminals 20, 21, 22 and 18 are connected to terminals 28, 29, 30 and 27 respectively, in the main station controller 7. The dictating machine is also provided with speech input terminals 23 and 24 and speech output terminals 25 and 26. These terminals are connected to terminals 31, 32, 33 and 34 respectively, in the main station controller 7.

Terminal 22 is connected to earth through contact B1 of relay $$\frac{B}{4}$$

in the main station controller 7. Thus, when the contact B1 is closed, the stop relay becomes energised and disengages the clutch thereby switching the dictating machine to the "stop" condition; if contact B1 is open, the terminal 22 is disconnected from earth and the clutch re-engages. Terminal 20 is connected to earth through contact B2 or contact E1 in the main station controller 7. Thus, when either contact B2 or E1 is closed the "listen-record" relay becomes energised and switches the machine to the "listen" condition. If both contacts B2 and E1 are open, terminal 20 is disconnected from earth and the "listen-record" relay becomes de-energised and switches the machine to the record condition. Terminal 21 is arranged to be connected to earth through contact F1 of relay $$\frac{F}{2}$$

in the main station controller 7. Thus, when contact F1 is closed, the backspace actuator becomes energised and through a pawl, ratchet wheel and screw, backspaces the record play-back head of the machine through a predetermined distance corresponding to approximately four seconds of recording. It will be evident that the record play-back head will be backspaced through the predetermined distance once every time terminal 21 is earthed.

The dictator's telephone set 1 is of the conventional type and comprises a transmitter 35, a receiver 36, coils 37, 38 and 39, a cradle switch 40, a capacitor 41 and a bell 42. The dialling circuit is not shown. The telephone set is connected via a low pass filter 43 to the telephone line at terminals 44 and 45.

The remote controller 3 is provided with terminals 46 and 47 which are connected to the telephone line at terminals 44 and 45 respectively. The remote controller comprises three series resonant circuits formed by (*a*) the inductor 48 and capacitor 50,
(*b*) the inductor 48 and capacitor 51, and
(*c*) the inductor 49 and capacitor 52, respectively.

Each of these series resonant circuits may be connected separately across terminals 46 and 47 by means of switches 53, 54 and 55 respectively. Furthermore, series resonant circuit *a* formed by inductor 48 and capacitor 50 and series resonant circuit *c* formed by inductor 49 and capacitor 52 may be connected simultaneously across the terminals 46 and 47 by means of switch 56. The resonance frequency of the series resonant circuits corresponding to the operation of switches 53, 54 and 55 are 7 kc./s., 8 kc./s. and 9 kc./s, respectively. Thus, the shunt impedance of the remote controller 3 will normally be very high, except when one of the switches is operated, in which case it will have a low impedance at the appropriate resonance frequency or frequencies. In order to make adjustments for variations in the length of the telephone line, a variable resistor 57 is connected between the common point of the switches and terminal 46.

The conventional main station telephone set 4 comprises a transmitter 59, a receiver 60, three coils 61, 62 and 63, a capacitor 64, a bell 65 and a cradle switch 66. The telephone set is connected via a low pass filter 67 to the telephone line at terminals 68 and 69.

The acceptor unit 5 has input terminals 70 and 71 which are connected to the telephone line at terminals 68 and 69, and output terminals 76 and 77 which are connected to terminals 84 and 83 in the main station controller. The input terminals are connected to the output terminals through contacts 72 and 73 of switch 6. The acceptor unit also comprises a lamp 81 connected through contact 75 on switch 6 to terminal 80, which is earthed. Terminal 79 is connected to a source of 6.3 volts A.C., not shown. Contact 74 is arranged to connect terminal 78 in the acceptor unit to the earthed terminal 80. Terminal 78 is connected to terminal 82 in the control unit.

Terminals 83 and 84 are connected respectively to the secondary winding 88 of transformer 89 and to the primary winding 85 of transformer 86, which windings are connected in series. The secondary winding 87 of transformer 86 is connected to terminals 91 and 92. These terminals are connected via a low pass filter 93 to the movable arms of changeover contacts E2 and E3 of relay $$\frac{E}{4}$$

The two pairs of fixed arms of contacts E2 and E3 are connected to terminals 31, 32, 33 and 34, respectively. Terminals 31, 32 are connected to the speech input terminals 23, 24 and terminals 33, 34 are connected to the speech output terminals 25 and 26.

Terminals 91 and 92 are also connected via a high pass filter 94 to earth and to the common input terminal 95 of the three selective networks 9, 10 and 11, respectively.

Each selective network comprises a frequency selective amplifier in the form of a pentode valve 96 having a parallel resonant circuit 97 as its anode load. The output of the amplifier is passed to the detector rectifier 98 the bias of which is adjusted by a potentiometer 99. The output of the detector rectifier is fed to the grid of triode 100 which has the coil of relay A in its anode circuit. The triode 100 and relay $$\frac{A}{3}$$

constitute the electronic relay 12. Relay A has N contacts A1 and A2 which are both open when the relay is de-energised. Selectors 10 and 11 are similar to selector 9 except that the resonant frequencies of their parallel resonant circuits are 8 kc./s. and 9 kc./s. instead of 7 kc./s. Furthermore, the triode of electronic relay 13 has a resistor 106 between cathode and earth. The cathode is also connected via a bias resistor 107 and contact D1 or relay $$\frac{D}{2}$$

to terminal 82.

Each selective network and associated relay is so arranged that its relay $$\frac{A}{3}, \frac{B}{4} \text{ and } \frac{C}{4}$$

respectively, is de-energised when a signal having the same frequency as the resonance frequency of its parallel resonant circuit is applied to the input of its selective network. Furthermore, relay $$\frac{B}{4}$$

is also de-energised when switch 6 and/or contact D1 are opened.

The stop signal generator 17 has an oscillator valve 101 and a tuned circuit 102 resonant at about 400 c./s. The tuned circuit includes a capacitor 103 which is connected to the earth lines and a tapped inductor 104. A resistor 105 is arranged so that when included in the resonant circuit 102 oscillation is suppressed as a result of the increased bias applied to the valve and of the increased losses in the resonant circuit. The common point between inductor 104 and the resistor 105 is taken to a terminal 27 which is connected to terminals 18 and 19 in the dictating machine. As stated above, terminal 18 is connected through a cam operated switch, not shown, to earth. The cam operated switch is closed intermittently when the recording head is within thirty seconds of recording from the end of the recording medium. Thus, the resistor 105 is short circuited, thereby causing the oscillator to oscillate, when the cam operated switch is closed. The resistor 105 is also short circuited when terminal 19 is earthed due to the clutch being disengaged. Consequently, the oscillator produces a continuous note when the machine is stopped and an intermittent note or pips when the recording head has almost reached the end of the recording medium. The output of the oscillator 17 is fed to terminal 108 of an amplifier which has a triode valve 109 having the primary winding 90 of transformer 89 in its anode circuit.

The oscillator 201 comprises three similar valve oscillators 110, 111 and 112. Each of these oscillators comprises a triode 113 and resonant circuit 114. The output of the three oscillators is fed to the common input terminal 108 of the amplifier. The oscillators are arranged to oscillate at 7 kc./s., 8 kc./s., and 9 kc./s. respectively.

The buzzer 16 has one end of its winding earthed, the other end being connected through contact D2 of relay $$\frac{D}{2}$$

to terminal 115 which is connected to a suitable source of D.C.

The relay circuits and their functions will now be described in conjunction with a description of the operation of the apparatus. It should be noted that Fig. 2 shows the apparatus with the relays de-energised.

When the dictator desires to dictate, he lifts the hand set of his telephone set 1 and dials the main station telephone number. When the bell 65 of the main station telephone rings, the operator lifts the hand set, thereby closing cradle switch 66. The operator, on being informed by the dictator that the dictating machine is required, operates switch 6 to close its contacts 72 to 75. The closing of contacts 72 and 73 connects terminals 83 and 84 to the telephone line. The impedance at terminals 83 and 84 looking into the main station controller 7 is similar to that of the main station telephone set after the cradle switch 66, so that the main station hand set may now, if desired, be replaced. The closing of contacts 74 connects contact D1 in the cathode circuit of the valve of electronic relay 13 to earth. The closing of contact 75 completes the circuit for the warning light 81 which lights up to indicate that the recording machine is engaged. The dictator now hears a 400 c./s. stop signal in his receiver, indicating that the machine is in the "stop" condition.

The dictator now presses the "record" switch button 53. This connects the tuned circuit comprising capacitor 50 and inductor 48 across the telephone line, causing it to present a low impedance to the telephone line to signals having a frequency of 7 kc./s. The proportion of the 7 kc./s. output of the control oscillator 201, after amplification, fed to the common input of the three selective networks thereupon rises above the minimum level and a switching signal having this frequency is, consequently, injected into the three selective networks.

The 7 kc./s. switching signal corresponds to the frequency at which the selective network 9 responds, and, after detection, operates the electronic relay 12, thereby de-energising relay $$\frac{A}{3}$$

causing its contacts A1 and A2 to open and A3 to close. Relay $$\frac{E}{4}$$

is arranged to be energised through contact C1 in series with a resistor 116. Contact A2 and contact E4, which are in series, are connected in parallel with relay $\frac{E}{4}$ and contact C1. Opening of contact A2 removes the short circuit across relay $\frac{E}{4}$ which thereupon becomes energised. This causes the changeover contacts E2 and E3 to switch the secondary 87 of transformer 86 to the speech input terminals 23 and 24 and opens contacts E1 and E4. Due to the opening of contact E1 (B2 will also be open as stated below) terminal 20 of the "listen-record" relay is disconnected from earth and the "listen-record" relay, therefore, becomes de-energised and switches the dictating machine to the "record" condition. Opening of contact E4 ensures that relay $\frac{E}{4}$ cannot be short circuited when the "record" switch button 53 is released. Upon contact A1 opening, relay $\frac{B}{4}$ which was previously short circuited through its own contact B3 in series with contacts A1 and C3, now becomes energised. On relay $\frac{B}{4}$ becoming energised, all its contacts open. Opening of contact B3 ensures that the short circuit across relay $\frac{B}{4}$ cannot be re-established when contact A1 closes upon release of the record switch button 53; opening of contact B1 disconnects the terminal 22 of the "stop" relay from earth and thereby starts the dictating machine; opening of contact B2, together with opening of contact E1, as stated above, switches the dictating machine to the "record" condition. The "stop" signal, which was audible after operation of switch 6 now ceases due to the clutch having become engaged. The dictator now dictates his message.

In order to stop the machine, the dictator operates the stop switch button 54 whereupon the remote controller effects the supply of a switching signal of 8 kc./s. which, in the above described manner, causes the de-energisation of relay $\frac{B}{4}$ of the electronic relay 13. De-energisation of relay $\frac{B}{4}$ closes all its contacts. Closing of contact B1 stops the dictating machine. Closing of contact B2 switches the dictating machine to the "listen" condition; closing of contact B3 re-establishes the short circuit across relay $\frac{B}{4}$ and closing of contact B4 connects resistor 117 across the speech output terminals 25 and 26 of the dictating machine.

In order to switch the dictating machine to the listen condition, the dictator presses the listen switch button 55, whereupon the remote controller effects the supply of a switching signal of 9 kc./s. which, in the above described manner, causes the de-energisation of relay $\frac{C}{4}$ of electronic relay 14. De-energisation of relay $\frac{C}{4}$ opens its contacts C1 and C3 and closes its contacts C2 and C4. Opening of contacts C3 removes the short circuit across relay $\frac{B}{4}$ which thereupon becomes energised. All the contacts of relay $\frac{B}{4}$ thereupon open. Opening of contact B3 ensures that the short circuit across relay $\frac{B}{4}$ cannot be re-established when contact C3 closes upon release of the "listen" switch button 55; opening of contact B1 starts the dictating machine; opening of contact B4 disconnects the resistor 117 from the speech output terminals 25 and 26 of the dictating machine. The "stop" signal, which was audible when the clutch was disengaged, now ceases. Opening of contacts C1 de-energises relay $\frac{E}{4}$. Thereupon its contacts E1 and E4 close and its changeover contacts E2 and E3 connect the secondary 87 of transformer 86 to the speech output terminals 25 and 26 of the dictating machine. The closing of contact E1 (despite contact B2 being open) connects terminal 20 of the "listen-record" relay to earth thereby energising it so that it switches the dictating machine to the "listen" condition. The closing of contact E4 re-establishes the short circuit across relay $\frac{E}{4}$ to ensure that when contact C1 closes upon release of the "listen" switch button 55, relay $\frac{E}{4}$ remains de-energised. Contact C4 is connected in series with contact D3, contact F2 of relay $\frac{F}{2}$ resistor 118, and winding 119 of relay $\frac{F}{2}$. Relay $\frac{F}{2}$ has a second winding 120 identical to winding 119 which is connected in series with a capacitor 121 across winding 119.

The closing of contact C4 energises relay $\frac{F}{2}$ and due to the particular arrangement of resistor 118, capacitor 121, relay windings 119 and 120, and contact F2, relay $\frac{F}{2}$ starts pulsating. This causes its contacts F1 and F2 to open and close continuously. Thus contact F1 intermittently connects terminal 21 of the backspace relay to earth, thereby energising the backspace actuator. The actuator backspaces the record play-back head of the machine through a distance corresponding to approximately four seconds of recording every time contact F1 closes. Thus, as long as the "listen" switch button is depressed, the play back head is moved back until the beginning of the required passage of the recording is reached, whereupon the "listen" switch button is released. The dictating machine which has already been switched to the "listen" condition thereupon plays back the message.

Should the dictator wish to call the operator, he presses the "call operator" switch button 56, whereupon the remote controller effects simultaneously the supply of switching signals of 7 kc./s. and 9 kc./s. which, in the above described manner, causes de-energisation of relay $$\frac{A}{3}$$

of electronic relay 12 and relay $$\frac{C}{4}$$

of electronic relay 14. De-energisation of these two relays cause, inter alia, contacts A3 and C2 to close whereupon relay $$\frac{D}{2}$$

becomes energised. Energisation of relay $$\frac{D}{2}$$

causes its contact D1 to open thereby causing relay $$\frac{B}{4}$$

of electronic relay 13 to become de-energised. Upon relay $$\frac{B}{4}$$

becoming de-energised the machine is stopped as described above. Closing of contact D2 connects the buzzer 16 via terminal 115 to a source of D.C. The buzzer thereupon produces an audible signal to call the operator. The operator then lifts the hand set of his main station telephone set and opens switch 6. The dictator can now give the operator any instructions he desires.

In order to ensure that the switching signals emitted by the control oscillator 201 are not injected into either of the telephone sets, these are directly preceded by low pass filters 43 and 67, respectively. These filters also ensure that the impedances presented to the signals are not affected by the telephone sets. Similarly, the signals are prevented from reaching the speech terminals of the dictating machine by a low pass filter 93, and in order that speech transmission does not affect the operation of the three selective networks, they are preceded by a high pass filter 94. The cut-off frequency of all the filters is 3.5 kc./s.

Though in the above described operation of the apparatus the dictator communicates with the operator at the beginning and at the end of the dictation, no such communication is actually necessary. Thus, if desired, the operator may merely close switch 6 when the main station telephone bell rings at the beginning of operation to accept the call, and open switch 6 to release the call and replace the recording medium when the call operator lamp 90 is lit at the end of the citation due to the dictator pressing the "call operator" switch button. If it is intended to use the apparatus without any communication taking place between the dictator and the operator, the main station telephone set can be replaced by a bell and a capacitor corresponding to the bell 75 and capacitor 74.

Although the operation has been described with reference to manual acceptance and release of the dictator's call, this acceptance and release can on some telephone systems be made automatic.

I claim:

1. Apparatus for remote control of a dictating machine comprising a pair of telephone lines, a dictating machine connected to receive speech signals from the telephone lines, oscillator means connected to the telephone lines including a plurality of alternating current signal generators each providing a signal having a frequency greater than about 3.5 kilocycles per second and corresponding to at least one operating condition of the machine, impedance control means connected to the telephone lines at a point remote from the dictating machine to vary the impedance of the lines to each of the alternating current signals selectively to change its level on the lines, a transducer also at the remote point connected to apply speech signals to the telephone lines, a low pass filter interposed between the transducer and the telephone lines to prevent passage of signals having a frequency greater than about 3.5 kilocycles per second, control apparatus associated with the said dictating machine including a high pass filter preventing passage of signals having a frequency below about 3.5 kilocycles per second, a plurality of frequency selective networks connected to receive signals passed by said high pass filter, a plurality of detector means, each of said detector means being connected to a corresponding one of said frequency selective networks, each detector means being responsive to a change in the signal level of one of the alternating current signals, and switching means operatively associated with the detector means and the dictating machine and separately responsive to operation of each of said detector means to set the dictating machine to the corresponding condition at any time during the operation of the system.

2. Apparatus according to claim 1 wherein the impedance control means includes a plurality of frequency selective networks and means for connecting each of said networks across the telephone lines to reduce the impedance of the system to alternating current signals of a selected frequency.

3. Apparatus according to claim 1 wherein said oscillator means and the said detector means are connected in series across the telephone lines.

4. Apparatus according to claim 1 wherein the switching means includes means responsive to initiation of operation of a frequency selective network to set the dictating machine to at least two required conditions and means for maintaining one of the required conditions after termination of operation of the network.

5. Apparatus according to claim 1 wherein the dictating machine is settable to a backspace condition and the switching means includes timing means responsive to operation of one of the frequency selective networks to set the dictating machine to the backspace condition periodically until the operation of the network is terminated.

References Cited in the file of this patent

UNITED STATES PATENTS

| | | |
|---|---|---|
| 2,284,306 | Sparling | May 26, 1942 |
| 2,329,107 | Clausen | Sept. 7, 1943 |
| 2,427,850 | Gehman | Sept. 23, 1947 |
| 2,519,318 | Kuhlik | Aug. 15, 1950 |
| 2,554,201 | Lundkvist | May 22, 1951 |
| 2,650,951 | Kobler | Sept. 1, 1953 |